Figure 1A:
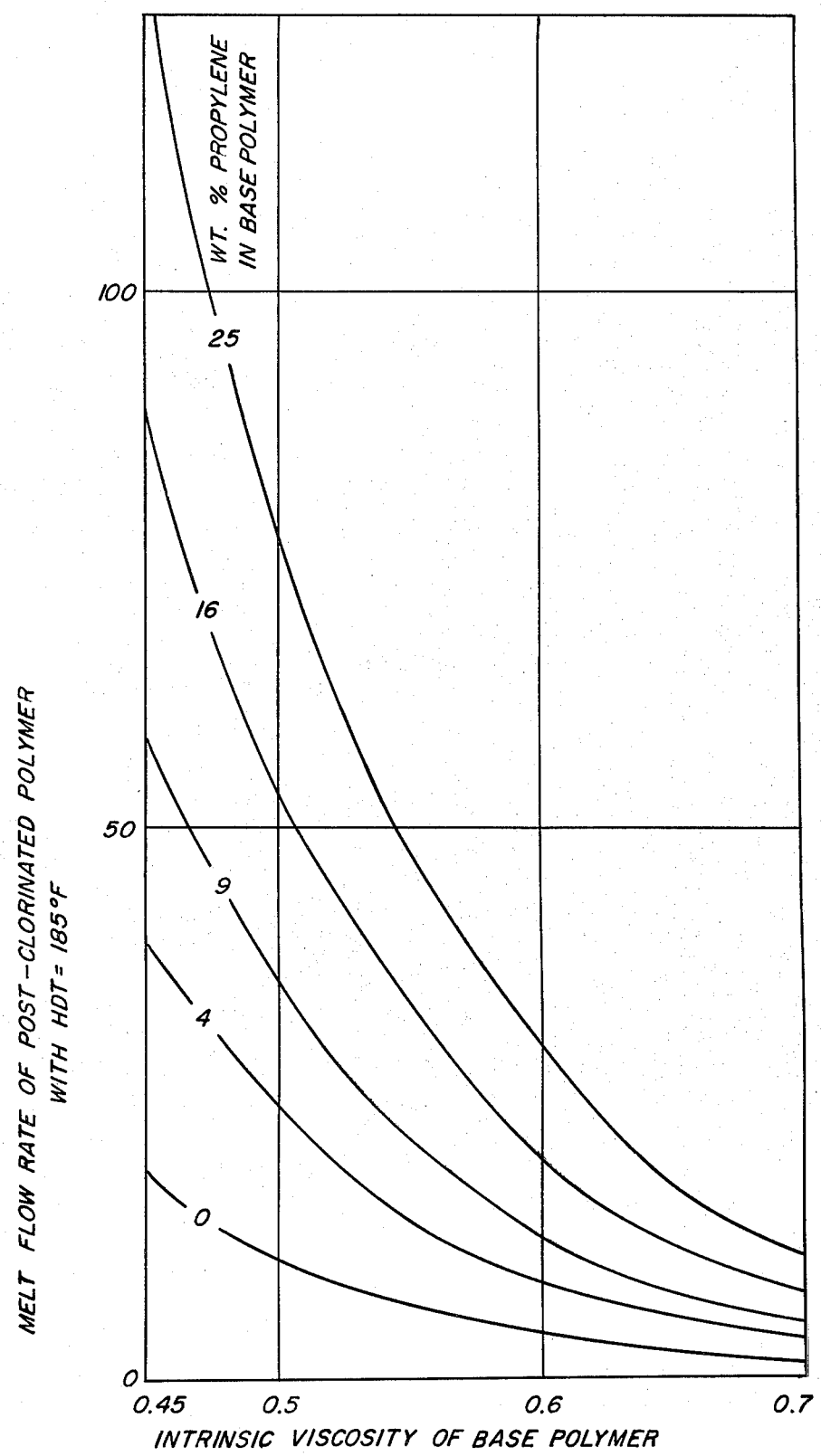

United States Patent [19]

Heiberger

[11] 3,925,337

[45] Dec. 9, 1975

[54] POST CHLORINATED VINYL CHLORIDE COPOLYMERS

[75] Inventor: Charles A. Heiberger, Princeton, N.J.

[73] Assignee: Air Products and Chemicals, Inc., Allentown, Pa.

[22] Filed: July 21, 1972

[21] Appl. No.: 273,936

Related U.S. Application Data

[63] Continuation of Ser. No. 846,417, July 31, 1969, abandoned.

[52] U.S. Cl. .... 260/87.5 C; 260/23 XA; 260/32.8 R
[51] Int. Cl. ............................................. C08f 15/02
[58] Field of Search .................. 260/87.5 R, 87.5 C

[56] References Cited
UNITED STATES PATENTS

| | | | |
|---|---|---|---|
| 2,568,692 | 9/1951 | Condo et al. | 260/87.5 |
| 2,996,489 | 8/1961 | Dannis et al. | 260/92.8 |
| 3,100,762 | 8/1963 | Shockney | 260/92.8 |
| 3,167,535 | 1/1965 | Gateff et al. | 260/92.8 |
| 3,468,859 | 9/1969 | Davies | 260/87.5 |
| 3,551,400 | 12/1970 | Yonezu et al. | 260/92.8 |

Primary Examiner—Stanford M. Levin
Attorney, Agent, or Firm—Richard A. Dannells; Barry Moyerman

[57] ABSTRACT

Modified vinyl chloride polymers, having elevated heat deflection temperatures, are provided by the post-chlorination of vinyl chloride-propylene copolymers.

6 Claims, 6 Drawing Figures

POST CHLORINATED VINYL CHLORIDE COPOLYMERS

This is a continuation of application Ser. No. 846,417, filed July 31, 1969, now abandoned.

This invention is concerned with post-chlorinated vinyl chloride polymers and resinous compositions formed therefrom suitable for hot molding, extrusion, thermo-forming, and other hot shaping operations to produce shaped objects having desirable physical properties, including high heat deflection temperatures.

Vinyl chloride homopolymers are, in general, rigid materials characterized by substantial resistance to chemical attack, and they are used extensively in the chemical processing industry as well as in other manufacturing applications. Thus, unplasticized rigid polyvinyl chloride resins have a desirable combination of properties, viz:

1. Excellent resistance to water, acids, alkalies, salts, organic chemicals, and to external aging environments.
2. Low vapor permeability to water, oxygen and many volatile organic compounds.
3. High clarity and gloss.
4. High modulus and physical strength.
5. Non-flammability.
6. Good electrical properties.

Polyvinyl chloride has been proposed for the making of structural parts such as roofing members and siding, wall sections, pipes and other fluid- and solid-conducting elements, and the like, and vinyl chloride homopolymers are generally suitable for such purposes if the shaped object formed from the polymer is not to be subjected to elevated temperatures in service. Polyvinyl chloride has a relatively low heat-deflection temperature (HDT), sometimes referred to as heat "distortion" temperature, as measured by standard testing procedures, particularly Test Method D-648 of the American Society for Testing and Materials (ASTM). It has been proposed to raise the HDT of polyvinyl chloride to an acceptable level for most purposes by "post-chlorinating" the polymer to increase its normal chlorine content. Various procedures for effecting such post-chlorination have been proposed. These include methods in which the polyvinyl chloride, in particulate form, is chlorinated while suspended in a liquid medium, such as water, generally in the presence of an organic solvent, as disclosed, for example, in Dannis et al U.S. Pat. No. 2,996,489 of Aug. 15, 1961 and Shockney U.S. Pat. No. 3,100,762 of August 13, 1963. There are also processes in which particles of polyvinyl chloride are exposed to the action of chlorine while in the dry state, such as disclosed in Rosenberg U.S. Pat. No. 2,590,651 of Mar. 25, 1952. Variations of this technique, wherein the polyvinyl chloride particles are kept in constant motion, as by tumbling, while being chlorinated, are disclosed in BASF German Pat. No. 801,304 of Jan. 4, 1951, and VEB Farbenfabriken Wolfen German Auslegeschrift of July 13, 1961. While these processes are effective to introduce chlorine into the polyvinyl chloride molecule, and by so doing to increase the HDT of the polyvinyl chloride, the introduction of the chlorine results in a concurrent hardening or stiffening of the polymer, so that its "melt flow" rate as measured by standard test procedures, such as ASTM D1238-57T, condition F, is greatly reduced and by the time sufficient chlorine has been introduced into the polymer to give the post-chlorinated polyvinyl chloride an adequately high HDT, its melt flow rate has become substantially zero so that it is resistant to molding and shaping by conventional molding techniques.

To overcome this problem it has been proposed to add to the post-chlorinated polyvinyl chloride so-called "external" plasticizers, such as dioctyl phthalate, or to form so-called "polyblends" with butadiene-acrylonitrile or acrylate polymers, or other polymeric compounding ingredients. These procedures, however, have ordinarily proven unsatisfactory because any improvement achieved has frequently been accomplished by an undue sacrifice of other desirable physical properties of the polymers, such as rigidity, impact toughness, chemical resistance, flame resistance, and the like, or the products are economically unattractive for most applications.

For example, when use is made of external plasticizers, the presence of even small concentrations of such plasticizers results in lower strength and reduced toughness. Polyblends with butadiene-acrylonitrile rubbers or acrylic polymers, or the like materials, do not generally give clear rigid plastics, are expensive, and degrade other properties such as weather resistance, chemical resistance, and non-flammability, and the HDT is also reduced. In short, when attempts are made to increase the melt flow characteristics of polyvinyl chloride compositions, the resultant shaped products are deficient in desired physical properties.

It is, accordingly, an object of this invention to provide resinous compositions having the desirable physical properties of polyvinyl chloride but having, at the same time, substantially greater heat deflection temperatures in combination with advantageous melt flow characteristics.

It has now been found that polymers having the desired end-properties of post-chlorinated polyvinyl chloride, including high HDT values at the same time possessing desirable and useful melt flow characteristics so that they can be easily molded to form products which are resistant to distortion or deflection at elevated temperatures, can be realized by certain post-chlorinated forms of certain vinyl chloridepropylene copolymers.

Thus, in accordance with this invention, there are provided post-chlorinated vinyl chloride-propylene copolymers which have a chlorine content, as measured by the well-known Parr bomb combustion method (Peroxide Bomb Apparatus and Method, Manual No. 121, Parr Instrument Co., Moline, Illinois, 1950) of 60 to 73 wt. percent, preferably 60 to 70 wt. percent, which exhibit HDT values of at least 185°F, preferably 185° to 250°F, and have melt flow values of 0.1 to 2000 dg./min., preferably 0.1 to 250 dg./min. These novel post-chlorinated polymers are obtained by introducing 5 to 30 wt. percent of chlorine into vinyl chloride-propylene copolymers (base polymers) having a propylene content of 2 to 25% by weight, preferably 2 to 12% by weight, a vinyl chloride content of 75 to 98% by weight, preferably 88 to 98% by weight, an intrinsic viscosity of 0.45 dl./g. to 1.2 dl./g., preferably 0.5 to 0.9 dl./g., and a melt flow value of 0.3 to 10,000 dg./min., preferably 0.5 to 1,000 dg./min.

Intrinsic viscosity values in dl./g., as used herein, are determined in conventional manner by extrapolation to infinite dilution of the reduced viscosity values at several concentrations of the polymer in cyclohexanone, as determined, for example, according to ASTM, D1243–60, Method A, but at 25°C. Weight percent propylene in the copolymers is determined from chlorine analysis and correlated with volume percent propylene as determined by measurements of specific gravity (ASTM D792-60T) on a standard molded composition containing 3 parts by weight of an organic tin mercaptide stabilizer (Advastab T-360) per 100 parts by weight of copolymer. Melt flow rate of the vinyl chloride copolymers from which the post-chlorinated polymers of this invention are made is determined by means of ASTM D1238-57T, condition F, for the copolymer in the above standard molded composition. The melt flow rate of the post-chlorinated products is determined by the same ASTM D1238-57T method, condition F, on a standard molding composition containing 4 parts by weight of Thermolite-32 (a tin maleate), and 1.5 parts calcium stearate per 100 parts post-chlorinated polymer.

It has been found that such post-chlorinated vinyl chloride-propylene copolymers in the form of molding compounds can be readily shaped by molding or extrusion techniques to form pipes, sheets and other forms which exhibit HDT values of at least 185°F, yet have melt flow values of at least 0.1 dg./min. Increased chlorine content within the above range provides higher HDT values but desirable melt flow values are still retained, i.e. melt flow values of at least 0.1 dg./min., even when the HDT is as high as 250°F, and even higher, e.g. up to about 300°F.

A critical part of the present invention is the use of a suitable vinyl chloride-propylene copolymer for post-chlorination and its post-chlorination to a critical minimum extent. The critical characteristics of the vinyl chloride-propylene copolymer employed are those set forth above. While the post-chlorination of such resins to the desired content does reduce their melt flow values, these values are never reduced to an unacceptable point, in contrast to the situation encountered in the post-chlorination of vinyl chloride homopolymer wherein even relatively small amounts of additional chlorine in the molecule bring about a reduction of the melt flow to unacceptable values, and even to zero.

While various vinyl chloride-propylene copolymers having the combination of properties described above can be used in preparing post-chlorinated vinyl chloride-propylene copolymers of this invention, particularly suitable and effective are the copolymers disclosed in the copending application of C. A. Heiberger and L. Fishbein Ser. No. 422,619, filed Dec. 32, 1964, now U.S. Pat. No. 3,468,858. Such vinyl chloride copolymers are linear in structure with minimum branching, with the propylene units being randomly distributed among the vinyl chloride units in the polymer chain, and are characterized by the presence of propylene-derived end-caps. The post-chlorinated forms of such copolymers with which this invention is concerned contain the additional chloride to provide the 60 to 73 wt. percent chlorine characteristic of these products attached to the copolymer backbone at the chain carbon atoms, so that a typical post-chlorinated copolymer of this invention includes units of the following structure:

It is believed that chlorination occurs first at the propylene tertiary carbon atoms and later at other carbon atoms as the chlorination proceeds.

In addition to the combination of properties previously mentioned, the post-chlorinated vinyl chloride-propylene copolymers of this invention also exhibit a unique relationship among melt flow, elevated use temperature, propylene content, and molecular weight. The elevated use temperature is conveniently taken as the HDT. Thus the post-chlorinated vinyl chloride copolymers of this invention can be further characterized by the following equation:

$$(1) \log MFR = 6.58 + 0.17 \sqrt{P} - 4.31 \frac{N - 0.04}{HDT}$$

wherein MFR is the melt flow rate in dg./min., HDT is the heat deflection temperature in °C of the post-chlorinated copolymer, and wherein P is the propylene content in weight percent and N is the intrinsic viscosity of the copolymer subjected to post-chlorination. As previously mentioned, the post-chlorinated copolymers of this invention have chlorine contents of at least 60% by weight and HDT values of at least 185°F (85°C).

Figure 1B:
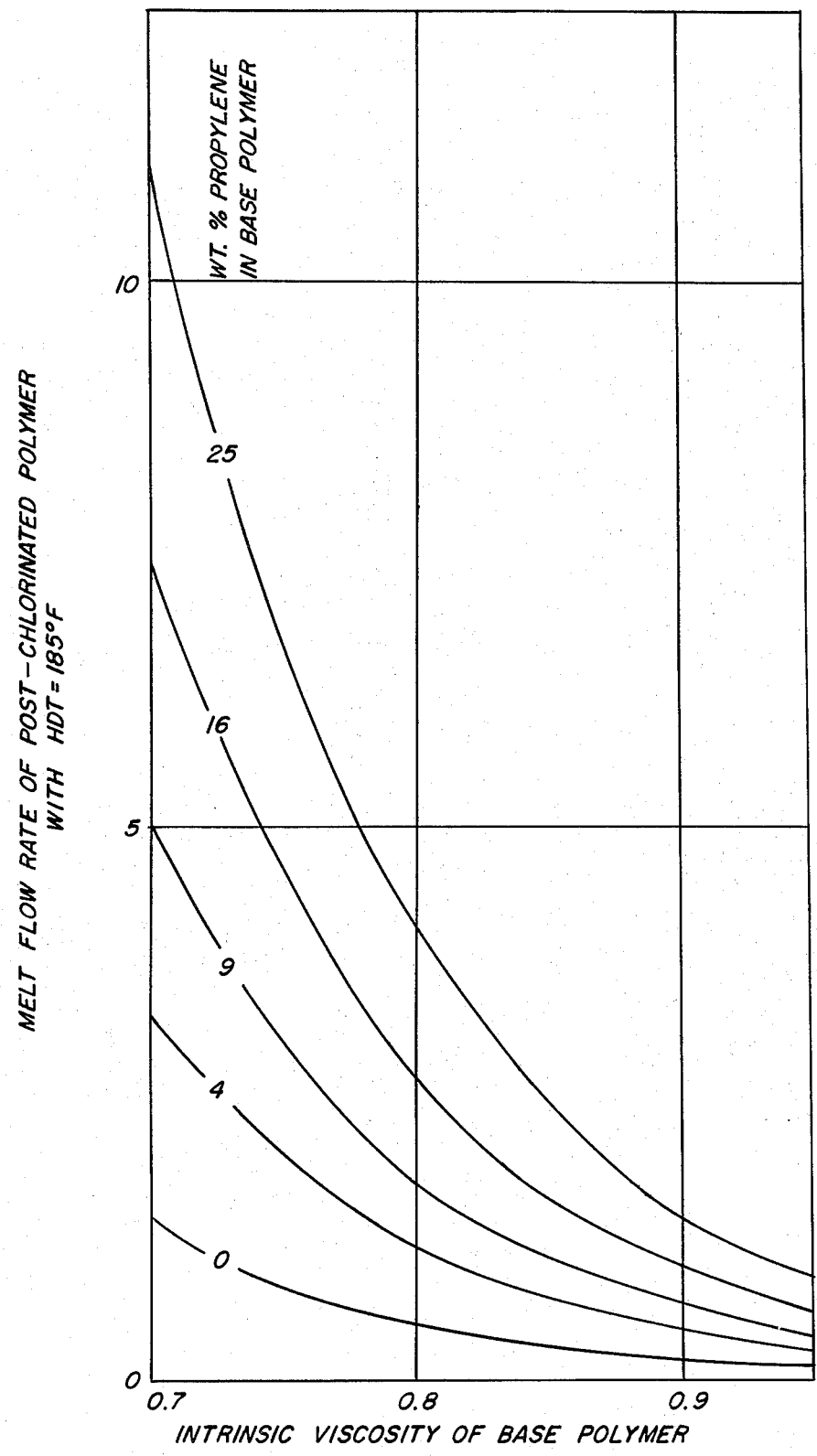

The significance of the relationship among the properties of the post-chlorinated copolymers of this invention, as indicated by the foregoing equation, are clearly evident from the accompanying drawings wherein FIG. 1a shows the melt flow rate of post-chlorinated vinyl chloride-propylene copolymers according to the invention having an HDT of 85°C (185°F) in relation to the weight percent propylene and the intrinsic viscosity of the corresponding non-post-chlorinated copolymers (base polymers) in the range up to 0.7 dl./g. intrinsic viscosity, compared with a post-chlorinated homopolymer having the same HDT value, FIG. 1b corresponds to FIG. 1a in the 0.7 to 0.9 dl./g. intrinsic viscosity range.

Figure 1C:
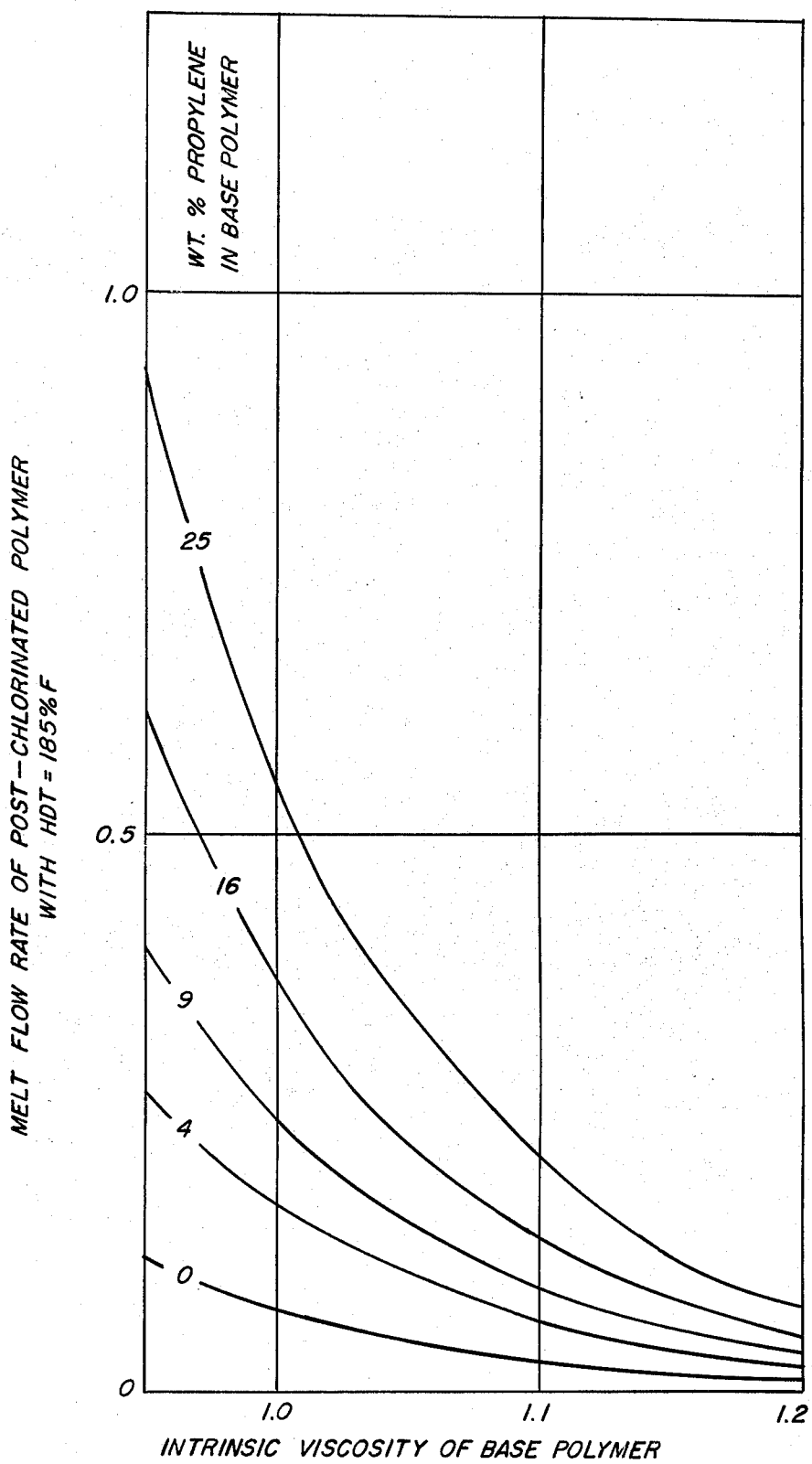
Figure 2A:
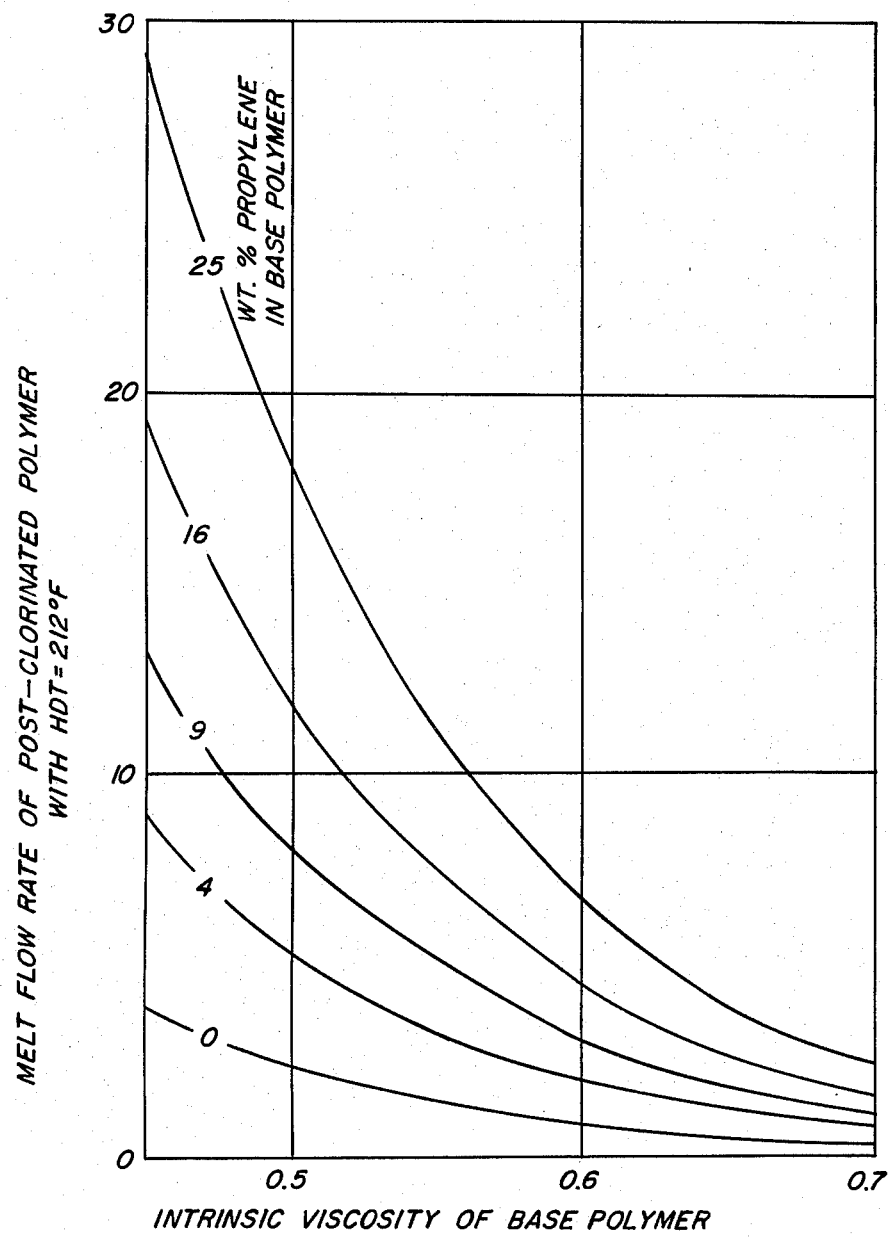
Figure 2B:
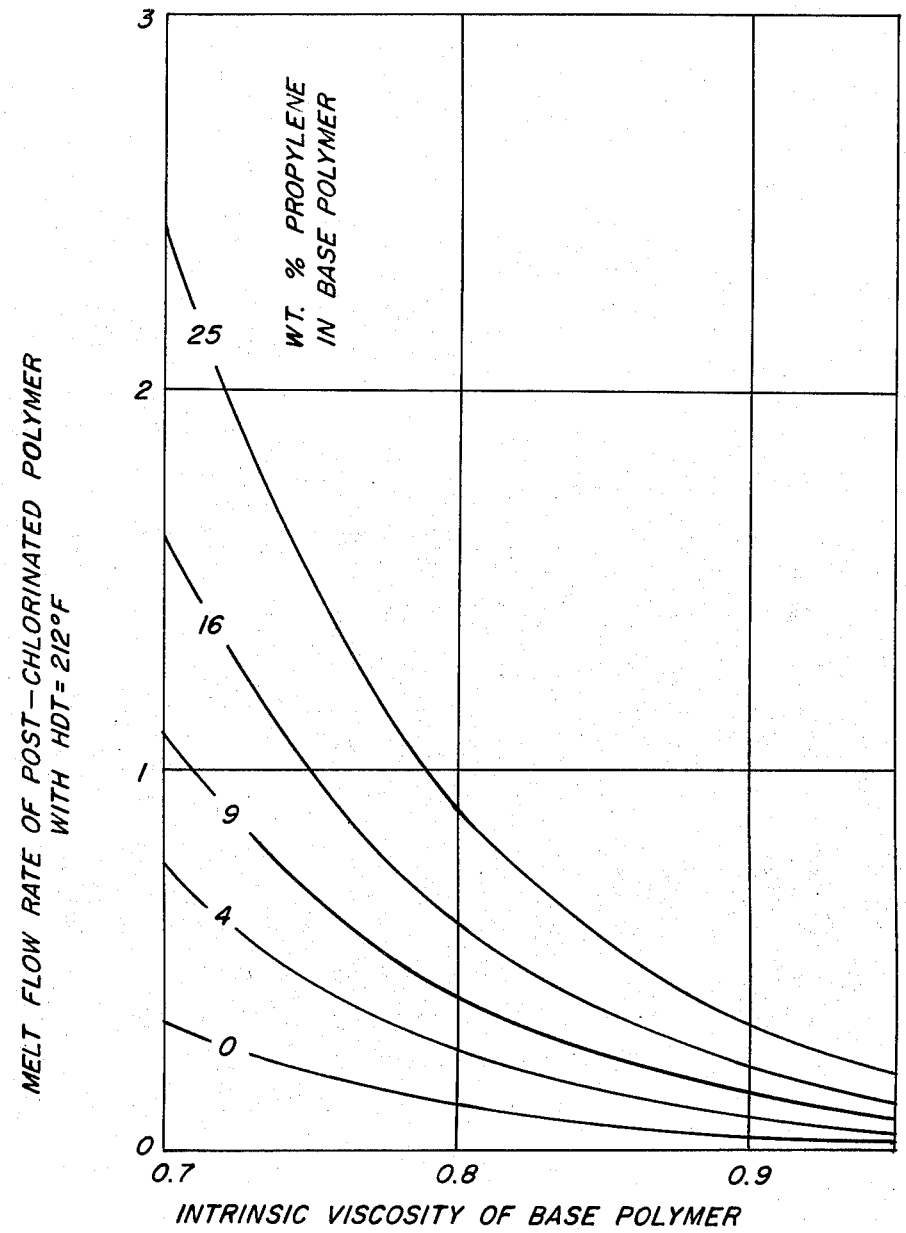
Figure 2C:
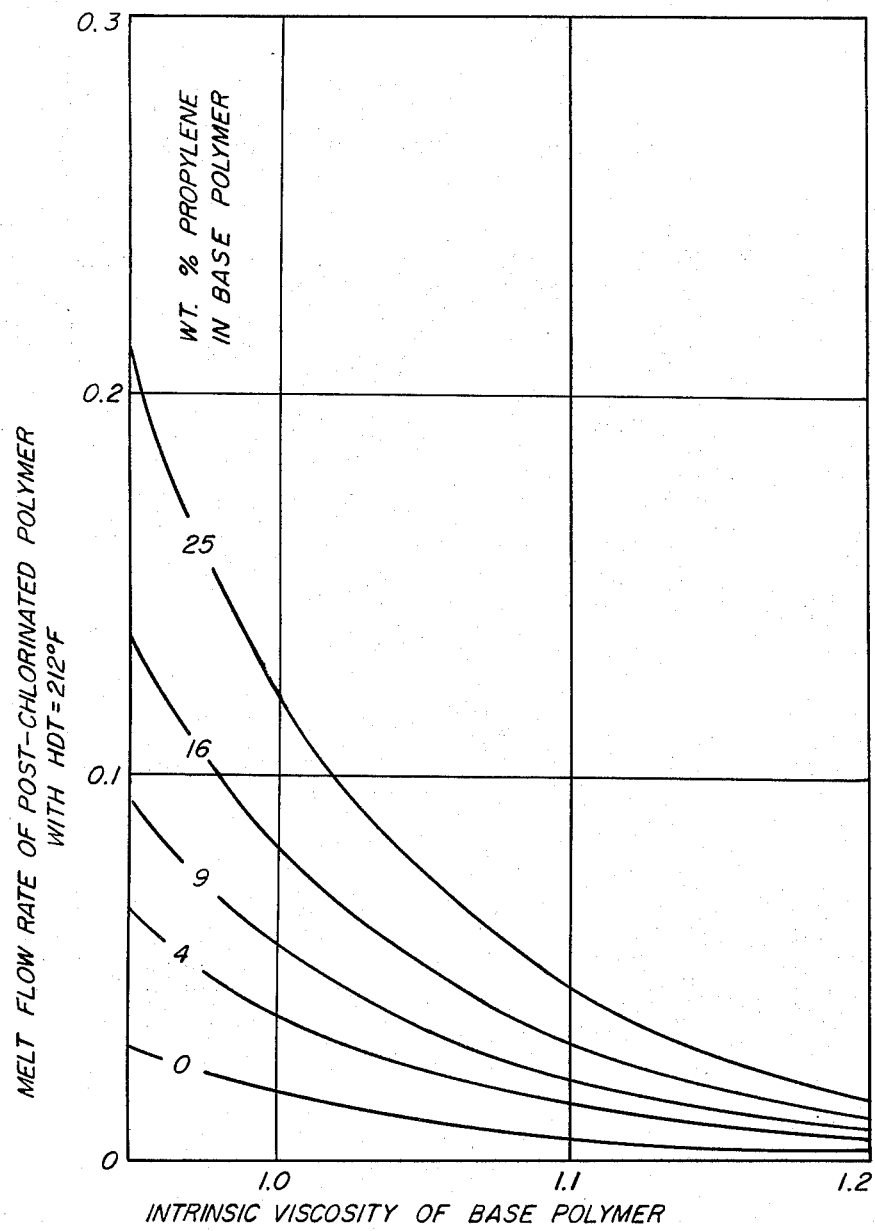

FIG. 1c corresponds to FIGS. 1a and 1b in the 0.9 to 1.2 dl./g. intrinsic viscosity range, and FIGS. 2a, 2b and 2c correspond to FIGS. 1a, 1b and 1c, respectively, for post-chlorinated polymers having an HDT of 100°C (212°F).

The vinyl chloride-propylene copolymers which, when chlorinated to a chlorine content of 60 to 73 wt. percent, provide the products with which this invention is concerned, are suitably produced by polymerization of vinyl chloride and propylene at temperature of 5 to 75°C, usually 30 to 60°C, at pressures that are usually no higher than about 250 lb. per square inch, generally 100 to 200 lb. per square inch. The most convenient process for preparing the vinyl chloride-propylene copolymers is essentially of the suspension polymerization type and the monomers are copolymerized in an aqueous system, under constant agitation, in the presence of appropriate suspending and surface active agents, with the pH being advantageously maintained at a value of 5 to 8.5. However, other processes known to the art, such as emulsion, solution, and mass polymerization can be employed to prepare these copolymers.

Various suspending agents such as those which have been disclosed for use in the suspension polymerization of vinyl chloride can be employed, and examples of

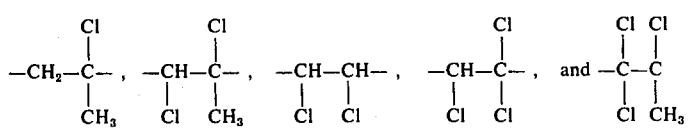

suitable suspending agents include polyvinyl alcohol, methyl cellulose, e.g. the products known commerically as "Methocel", gelatin, magnesium carbonate, guar gum, silica, magnesium lauryl sulfate, and magnesium silicate. We have found, however, that particularly good results are obtained when the suspending agent is polyvinyl alcohol or methyl cellulose. When polyvinyl alcohol is used as the suspending agent, we prefer to use partially-hydrolyzed polyvinyl alcohol, e.g. polyvinyl alcohol having a percent hydrolysis of 80 to 90, rather than fully hydrolyzed polyvinyl alcohol and of the type which forms solutions of medium viscosity, e.g. 30 to 50 centipoises in a 4% aqueous solution at 20°C. Commercial forms of such polyvinyl alcohol are exemplified by the products known as "Elvanol 50-42", "Gelvatol 20-90", and "Vinol 540".

Particularly suitable as catalysts are the oil-soluble free-radical catalysts such as the organic peroxides, e.g. lauroyl peroxide, acetyl peroxide, benzoyl peroxide, and diisobutyryl peroxide, peroxy pivalates such as tert-butyl peroxy pivalate, tertiary butyl perbenzoate, tertiary butyl hydroperoxide, acetyl-l-methyl cyclohexyl surfuryl peroxide, dihalobenzoyl peroxides such as 2,4-dichlorobenzoyl peroxide, dialkyl peroxy carbonates, such as diisopropyl peroxycarbonate, or the azo catalysts, e.g. the azo-nitrile catalysts, such as disclosed in Hunt U.S. Pat. No. 2,471,959, e.g. 2,2'-azo-bis-isobutyronitrile, which is commercially referred to in the art as "AZN", 2,2'-azo-bis($\gamma,\gamma$-dimethyl)-valeronitrile and 2-(tert-butyl-azo)2-phenyl propane. Also particularly suitable is the use of a water-soluble promotor, such as sodium bisulfite, in combination with the oil-solution free-radical catalyst.

While the above-mentioned catalysts are particularly suitable for the preparation of vinyl chloride-propylene copolymers containing up to about 15 wt. percent propylene and are effective to produce copolymers of the character described in U.S. Pat. No. 3,468,858, other catalyst systems are preferably used for higher propylene copolymers up to 25 wt. percent. For this purpose classes of initiators mentioned above, particularly the peroxide and hydroperoxide types may be used in conjunction with activating chemicals. The activators are employed to permit effective use of the initiators at lower temperatures than those at which they are commonly recognized as being effective by themselves. Examples of such activators are organic boron compounds, such as triethyl boron and other alkyl boranes; inorganic boron compounds such as borane and its complexes; compounds of metals having variable valence states such as iron, vandium, cobalt, nickel, manganese, palladium, platinum titanium, chromium, silver, etc., as well as the metals themselves in finely-divided form. Such metal compounds may be water-soluble such as acetylacetonates or compounds containing other organic complexing agents or ligands. Ziegler catalysts such as diethyl aluminum chloride-butyl titanium trichloride can also be used.

The quantity of suspending agent can vary widely, but most suitably it is present in the amount of 0.01 to 0.5% by weight based upon the total quantity of monomers in the aqueous system, preferably 0.02 to 0.2% by weight. Similarly, the quantity of catalyst can vary, but best results are obtained when the catalyst is present in the amount of 0.01 to 2.0% by weight based upon the monomers, preferably 0.05 to 0.5% by weight.

The aqueous suspension polymerization system also may advantageously include a wetting agent in the amount of 0.001 to 1.0% by weight of the monomers, preferably 0.005 to 0.5% by weight. Any of the many wetting agents used in suspension polymerization systems may be employed, but most preferably the wetting agent is sodium di-octyl sulfosuccinate, e.g. the product sold commercially as "Aerosol-OT".

In order to maintain the pH of the suspension system at the desired value, there is suitably added an alkaline buffering agent of any convenient type. Any alkaline material which is compatible with the suspending agent can be used as the buffer. The amount of buffer is that sufficient to adjust the pH of the suspension within the desired range. Ammonium and sodium bicarbonate are preferred buffers because of their compatibility with the system and their low cost. The amount of buffer is generally about 0.1 to 0.5% by weight, based on the monomers. Other buffers such as disodium phosphate, sodium acetate, and the like, can, however, also be used. When superior electrical properties are desired in the product a non-metallic buffer, such as ammonium bicarbonate, is preferred.

The amount of water used is that which is sufficient to accommodate the various components of the system and to support the resultant copolymer in suspension in conventional manner. Thus, ordinarily the weight ratio of water to total monomer is from about 1 to 1 up to about 4 to 1.

In carrying out the polymerization operation, a solution of the suspending agent and wetting agent is first prepared. This is effected by dissolving the wetting agent in sufficient water to form a solution, followed by the portion-wise addition of the suspending agent, while stirring the solution vigorously. Alternatively, the suspending agent and the wetting agent can be separately dissolved and the resulting solutions combined. Although it is not necessary to do so, the foregoing steps are suitably carried out with the water at a slightly elevated temperature, e.g. 75° to 80°C, and after the solution has been formed it is allowed to cool to room temperature. The foregoing solution is then diluted with enough water to form the desired volume to be charged to the polymerization vessel, and the buffering agent is dissolved in the solution.

The solution is then, in the case of batch polymerization, charged to a suitable polymerization vessel, such as an autoclave constructed to withstand pressures up to about 200 pounds per square inch, and the catalyst is added to the solution. The autoclave is sealed and flushed successively with nitrogen and then with vinyl chloride in vapor form. Agitation of the reactor contents is begun, and the vinyl chloride monomer and the propylene monomer are introduced, the vinyl chloride monomer being introduced as a liquid and the propylene monomer being introduced in liquid or in gaseous form, preferably as a liquid. The polymerization system is then brought to reaction temperature, e.g. 50°C with constant agitation, and reaction is continued until the desired polymerization is achieved. The time of reaction will, of course, vary, depending upon the size of the apparatus and the volumes of the reactants employed, but, ordinarily, reaction times of 8 to 16 hours are generally sufficient.

The vinyl chloride can be added entirely at the beginning of the reaction, but it can also be added stepwise or intermittently during the course of the reaction, the rate of addition of the liquid monomer being controlled so that there is always free vinyl chloride monomer present in the reaction vessel. This can be readily determined by sampling or by other conventional means.

The ratio between the propylene monomer and the vinyl chloride monomer is selected to provide a copolymer having the above specified content of 2 to 25 wt. percent or more of propylene. In general, in carrying out the polymerization method described, the ratios between the propylene and vinyl chloride charged are such that the propylene is present usually in at least about 100% excess in relation to the ratios of the two monomers in the finished copolymer, polymerization being continued until most of the vinyl chloride charged has reacted, e.g. 85 to 95%.

Various methods which have been disclosed for the post-chlorination of polyvinyl chloride (vinyl chloride homopolymer), such as those mentioned above, can be employed to post-chlorinate the vinyl chloride-propylene copolymers but the so-called "dry" post-chlorination processes have been found to be generally more attractive from a commercial standpoint and are, for this reason, preferred. In this connection, reference is made to the processes of Rosenberg U.S. Pat. No. 2,590,651, BASF German Pat. 801,304, VEB Farbenfabriken Wolfen German Auslegeschrift 1,110,873, and Dynamit Nobel Belgian Pat. 618,984. However, of particular suitability and effectiveness is the process defined in the application of Lester Weintraub entitled "POST-CHLORINATION OF VINYL CHLORIDE COPOLYMERS" being filed concurrently herewith.

In general, when the post-chlorination is carried out in a liquid system the vinyl chloride-propylene copolymer is used in particulate form, advantageously having particle sizes within the range of 10 to 200 $\mu$, and is preferably used in the ratio of 5 to 40 parts of copolymer per hundred parts by weight of liquid medium, which may be water or organic solvent, e.g. chloroform or mixtures of the two, such as is well known in the art. Post-chlorination in such "wet" systems is suitably carried out at 60° to 130°F with a stream of chlorine passed through the suspension or solution. The reaction is ordinarily catalyzed by means of actinic light of the type used for catalyzing the post-chlorination of vinyl chloride homopolymer.

When the post-chlorination is carried out in a "dry" system, the vinyl chloride-propylene copolymer is also used in particulate form with particle sizes of 40 to 400 $\mu$ being preferred. Post-chlorination may be effected in a fixed bed such as described in Rosenberg U.S. Pat. No. 2,590,651 or in a system in which the particles are maintained in constant motion. In these instances the chlorine is preferably diluted with an inert gas, such as nitrogen or hydrogen chloride, and the ratio of diluent gas to chlorine in that case is typically 70:30 but can be higher or lower. Actinic light is advantageously used as a catalyst, any light of the type used for catalyzing the post-chlorination of vinyl chloride homopolymer being advantageously employed. As previously mentioned, a particularly suitable and effective process for the chlorination of vinyl chloride-propylene copolymers is that disclosed in the application of Lester Weintraub for "POST-CHLORINATION OF VINYL CHLORIDE COPOLYMERS". That process gives particularly rapid chlorination so that substantial amounts of chlorine can be introduced into the molecule in reasonable amounts of time. As disclosed in that application, the resin particles are fluidized with a stream of chlorine, which may be diluted with an inert gas, such as nitrogen, and while fluidized, the particles are exposed to fluorescent light having a wave length within the range of 4000 to 5100 Angstrom units, most specifically in the range of 4000 to 4800 Angstrom units. It is preferred that the particles of polymer being chlorinated be regular in size, not having a wide particle size distribution range. The average particle size suitably ranges from about 30 microns to about 300 microns and more, but preferably is from 70 to 130 microns. The particle size limit is preferably maintained within the range of about 10 microns up to about 400 microns. Also, the bulk density of the resin should be from 15 to 30 pounds per cubic foot and preferably from 20 to 30 pounds per cubic foot. Preferred reaction temperatures are from about 40°C up to 75°C. The lower temperature is determined by what is a practical rate of reaction since temperature is one factor which affects the reaction rate. The higher temperature is limited by its degradation effect on the vinyl halide polymer. Therefore, it is preferred to maintain a reaction temperature between about 60°C and 70°C.

The temperature within the reactor is maintained at a desired level by either external heating or cooling, by internal heating or cooling, and/or by regulating the temperature of the gas fed to the reactor. The reaction is exothermic and at first produces an excessive amount of heat, which requires cooling. As the chlorination proceeds, the rate of reaction decreases so that the heat of reaction is normally insufficient to maintain the desired temperature. Thus, both heating and cooling are supplied during the reaction.

The gas flow through the reactor is in a fluidizing amount. This amount varies somewhat with the particle size, smaller particles requiring less gaseous volume for fluidization than larger particles. The fluidizing amount of gas ranges from about 2 to about 6 or more standard liters per minute per square inch cross-sectional area in the reactor. In most instances, the range varies from 4 to about 6 standard liters per minute per square inch cross-sectional area of reactor. However, the gas flow and the composition of the gas have a significant effect upon the chlorination reaction and merely concern with adequate fluidization is insufficient.

As a general rule, at the beginning of the reaction the ratio of diluent gas to chlorine should be at least 1:1 parts by volume, and suitably ranges up to 20:1 parts by volume. Preferably the range is 2:1 to 10:1. While the chlorine to inert gas ratio and the flow rates can be maintained substantially constant throughout the reaction, it has been found that unexpectedly high reaction rates and percentages of chlorine in the product can be obtained if the temperature is raised in the course of the post-chlorination and if the concentration of chlorine in the gas fed to the reactor is increased during the course of the reaction so that in the latter part of the reaction undiluted chlorine is introduced as the only gas. The exact schedule of temperature increase and chlorine concentration increase can, of course, be varied widely, but it has been found that a temperature change of at least about 5°C and suitably up to 20°C between the initial temperature and the final temperature, with the final temperature most suitably being employed throughout the second half of the reaction period. Similarly, it has been found most suitable to provide a chlorine to inert gas ratio of more than 1:1 at about the midpoint of the reaction period and to have a substantially 100% chlorine flow during at least the last quarter of the reaction period.

Whatever the method employed for post-chlorinating the vinyl chloride-propylene copolymers having the combination of characteristics defined above, to produce the novel post-chlorinated vinyl chloride-propylene copolymers of this invention, post-chlorination is continued until the copolymers contain the minimum of 60% chlorine.

The utility of the post-chlorinated vinyl chloride-propylene copolymers lies in their application in the formation of shaped articles by conventional forming operations under the application of heat, particularly shaped articles which are to be exposed in service to elevated temperatures, e.g. temperatures of 185° to 250°F, and even higher, e.g. up to about 300°F. When used to make such articles, the resins are suitably compounded in conventional manner, i.e. they may have added to them stabilizers and lubricants, and they may also be compounded with fillers, pigments, and resin additives to modify properties as desired. Conventional compounding agents of a type well known in the polymer art, and particularly in connection with vinyl resins, are suitable used. For example, suitable stabilizers include the well-known alkyl tin mercaptide (Thermolite 31), di-octyl tin dilaurate, basic lead carbonate, metal phenates such as zinc, lead or tin phenate, and barium n-nonyl phenate, fatty acid soaps of lead, cadmium, barium, calcium, magnesium and zinc, cadmium benzoate, triphenyl phosphite, mono-octyl diphenyl phosphite, di(epoxy-ethyl)benzene, epoxidized fatty oils, manganous pyrophosphite, and the like, alone or in combination. The function of various stabilizers in vinyl polymers is well known and is described, for example, in "Polymer Processes" by Schildknecht, pages 542–548. In general, any of the many stabilizers suitable for use with polyvinyl chloride may be employed.

In like manner, conventional lubricants, such as mineral oil, fatty acids, synthetic waxes of the fatty amide and ester types, octyl stearate and calcium stearate, are used. Polymer lubricants are referred to in Schildknecht, pp 685 et seq. The stabilizers or inhibitors and lubricants are used in varying quantities, such as described in the foregoing publication, depending upon the nature of the individual agent. For example, stabilizers are generally used in the amount of 0.5 to 5% by weight of the post-chlorinated copolymers but the overriding criterion is the use of a small amount sufficient to effect the desired stabilization. The same considerations apply in the use of lubricants. In general, lubricants are used in amounts ranging from 0.1 to 1% or more by weight of the copolymer. In accordance with this invention, the post-chlorinated vinyl chloride-propylene copolymers are combined with 0.1 to 10% by weight of combined lubricant and stabilizer.

Any and all pigments commonly employed in coloring polyvinyl chloride compositions may be used, such as carbon black, titanium dioxide, phthalocynanines, and the like, depending upon the color, if any, desired in the final product.

Either fibrous or non-fibrous fillers may be employed in preparing resinous compositions comprising the post-chlorinated vinyl chloride-propylene copolymers. The fibrous fillers that may be used include asbestos, glass fibers, cotton, rayon, nylon and the mineral wools. Asbestos is the most commonly used fibrous filler. The useful non-fibrous inorganic fillers include the many materials that are commonly employed as fillers in the plastics industry. These include, for example, calcium carbonate, calcium sulfate, calcium silicate, barium carbonate, barium sulfate, silica, china clay, kaolin, fuller's earth, and magnesium silicate, as well as such pigments as titanium dioxide, lead chromate, and the like.

The fibrous fillers can suitably be used in amounts up to approximately 200 parts and the non-fibrous fillers in amounts up to approximately 300 parts by weight per 100 parts by weight of post-chlorinated vinyl chloride copolymer resin.

While plasticizers are not ordinarily used in making rigid products, they can be used if desired. Any of the usual plasticizers for vinyl chloride resins may be used in the compositions of the present invention. These include, for example, dioctyl phthalate, dibutyl sebacate, tricresyl phosphate, and the like. The amount of plasticizers which can be used can vary depending on the rigidity and hardness desired.

In addition to the ingredients described, other resin additives, such as extenders, solvents, binders, and the like, may be present in the amounts ordinarily employed in the polyvinyl chloride art.

It is sometimes desirable to compound the post-chlorinated vinyl chloride-propylene copolymer resin compositions with other resinous materials which have a modifying effect upon the polymer resin. Examples of resinous materials suitable for this purpose include polyvinyl chloride, vinyl chloride-vinyl acetate, copolymer and other vinyl chloride copolymers, chlorinated polyolefins, chlorinated polyvinyl chloride and other chlorinated vinyl chloride copolymers, acrylonitrile-butadiene-styrene polymers, acrylonitrile-butadiene copolymers, alkyl acrylate-methacrylate copolymers, such as polymers containing ethyl acrylate and methyl methacrylate, ethylene-alkyl acrylate copolymers, ethylene-vinyl acetate copolymers, and chlorinated paraffin waxes. Such modifying resinous materials can be used in various amounts but ordinarily in relatively minor proportions, e.g. less than 50% by weight of the vinyl chloridepropylene copolymer resin, preferably 5 to 25%.

It will be understood that the resinous compositions, e.g. molding compounds or extrusion compounds, comprising the post-chlorinated vinyl chloride-propylene copolymers of this invention having the specified characteristics are suitably employed in practice in conventional particular form, e.g. as pellets, powders, granules, and the like. It will also be understood that in forming the resinous compositions of the invention, the components which are combined with the post-chlorinated vinyl chloride-propylene copolymers may serve more than one function. For example, it is well known that some stabilizers have appreciable lubricating properties, or that some so-called lubricants are also effective stabilizers. Calcium sterate is a typical example of an additive suitably used in forming our rigid resinous compositions, which functions both as a lubricant and a stabilizer, although it is a relatively weak stabilizer. Accordingly, while the compositions are defined as comprising the post-chlorinated vinyl chloride-propylene resin, a stabilizer, and a lubricant, it will be understood that a single additive can meet the stabilizer and lubricant requirements, and that two different additives are not always required. The same is true of other additives; thus a modifying resinous material may also serve as a plasticizer, and a filler may also serve as a pigment, and the like.

While the invention has been described above in its broader terms, it will be more fully understood by reference to the following specific examples of practical application. In the examples, all parts are by weight, unless otherwise indicated.

Physical characteristics of the vinyl chloride-propylene copolymers, the post-chlorinated vinyl chloride-propylene copolymers or formable rigid resinous compositions embodying them, which may be referred to below, and which are not identified by previously mentioned testing methods, are determined by conventional standard tests.

EXAMPLE 1

This example illustrates a typical preparation of vinyl chloride-propylene copolymers suitable for post-chlorination to a minimum of 60% chlorine to provide a post-chlorinated vinyl chloride-propylene copolymer having the characteristics of the post-chlorinated products of this invention.

A jacketed stainless steel autoclave was employed as the reaction vessel. Agitation was provided by a four-bladed axial-flow impeller and combination baffle-thermowell. Vinyl chloride and propylene monomers, both CP grade, where employed. The vinyl chloride monomer was distilled before use, whereas the propylene, a low oxygen content type, was used without further purification.

There were used about 140 parts of vinyl chloride and 16 parts of propylene. The polymerization mixture was composed of the following components in the proportions indicated relative to the combined weight of the two monomers.

|  | % of Total Monomers |
|---|---|
| Water | 200.0 |
| t-butyl peroxy pivilate (Lupersol 11) | 0.3 |
| Methyl cellulose (Methocel 90 HG 100 cpa.) | 0.07 |
| Sodium di-octylsulfosuccinate (Aerosol-OT-75% aqueous solution) | 0.008 |
| Sodium bicarbonate (buffer) | 0.023 |

A solution of the suspending agent and wetting agent was prepared by stirring the Aerosol-OT in 75% solution into 6.6 parts of deionized water and heated to 80°C with agitation and the suspending agent (Methocel) was added. The resultant mixture was allowed to cool to room temperature with continuous stirring. The sodium bicarbonate was then added, followed by the addition of 1.1 parts of the deionized water as a rinse to assure a complete transfer of the solution from its preparation vessel to the storage vessel.

The reaction vessel was then charged with 302 parts of deionized water, the catalyst, and the aqueous suspending agent, wetting agent, buffer, and 3.3 parts deionized rinse water. The reactor was filled to about 88% of its volume. The reactor was then sealed and flushed out successively with nitrogen and vinyl chloride vapor. The distilled vinyl chloride was added as a liquid, after which stirring was commenced, followed by the addition of the propylene. Then the reactants were brought to a reaction temperature of about 54.5°C over a 40 min. period and allowed to react for 11 hours at a maximum pressure of 185 psig. The temperature of the reaction mixture was then lowered to about 25°C, and the excess monomers vented off. The product was centrifuged and dried in a vacuum oven at a jacket temperature of 85°C (60°C resin temperature) and 27″ Hg vacuum for approximately 6 hours. The product obtained in approximately 76% conversion (based on total monomers) was a fine, white, free-flowing powder. It contained about 5.9% propylene and 94.1% vinyl chloride by weight, and had an intrinsic viscosity of about 0.59 dl./g., a melt flow rate of 107 dg./min., an HDT of 158°F, and a specific gravity at 25°C of 1.267.

Using corresponding procedures, other vinyl chloride propylene copolymers were prepared by varying the weight percent of propylene, the reaction temperature, the catalyst, the quantity of emulsifier or suspending agent, or monomer ratios.

Typical data for the resultant vinyl chloride-propylene copolymers for these thus-produced copolymers are shown in Table 1.

EXAMPLE 2

This example illustrates the post-chlorination of vinyl chloride-propylene copolymers to produce post-chlorinated copolymers having the characteristics conforming to this invention by employing a typical "wet" post-chlorination process.

The reactor employed was a 4-liter resin flask equipped with surrounding water bath, stirrer, thermometer, gas inlet tube and condenser. An ultra-violet light was placed adjacent the flask. The reaction mixture consisted of 2200 g. of water, 140 g. of the vinyl chloride-propylene copolymer produced in Example 1, and 100 g. of chloroform. The water and the vinyl chloride-propylene copolymer were charged to the flask, the resin which has a particle size of 10 to 200 H forming a suspension in the water. The suspension was then purged with nitrogen for 15 min. using 10–15 liters per hour, the chloroform was added, and chlorine was then introduced over a period of about 10 minutes in sufficient quantity to saturate the mixture while the latter was warmed to about 30°C. The ultra-violet light was then turned on and chlorine was introduced at a rate slightly in excess of the rate at which it was consumed. The temperature was maintained at a maximum of 40°C by means of the water bath, and after a period of about 60 min. the ultra-violet light, and after about 75 min. the

TABLE 1

| Copolymer No. | 1 | 2 | 3 | 4 | 5 | 6 | 7 | 8 | 9 |
|---|---|---|---|---|---|---|---|---|---|
| Wgt.% Propylene | 5.9 | 5.1 | 7.5 | 2.1 | 4.4 | 4.8 | 4.5 | 7.7 | 3.4 |
| Sp. gr. at 25°C | 1.367 | 1.372 | 1.356 | 1.391 | 1.377 | 1.374 | 1.376 | 1.355 | 1.384 |
| Intrinsic visc.,dl./g. | 0.59 | 0.59 | 0.57 | 0.62 | 0.64 | 0.65 | 0.68 | 0.64 | 0.75 |
| Melt flow rate,dg./min. | 107 | 59 | 151 | 16 | 36 | 21 | 17 | 66 | 5.7 |
| HDT, °F | 158 | 160 | 151 | 169 | 164 | 162 | 163 | 154 | 175 |
| Copolymer No. | 10 | 11 | 12 | 13 | 14 | 15 | 16 | 17 | |
| Wgt.% Propylene | 6.6 | 2.7 | 4.2 | 10.0 | 9.6 | 9.0 | 10.4 | 20.0 | |
| Sp.gr. at 25°C | 1.362 | 1.388 | 1.379 | 1.339 | 1.342 | 1.346 | 1.337 | 1.277 | |
| Intrinsic visc.,dl./g. | 0.76 | 0.86 | 1.02 | 0.52 | 0.50 | 0.50 | 0.45 | 0.48 | |
| Melt flow rate,dg./min. | 15 | 0.45 | 0.5 | 226 | 288 | 447 | 702 | 2340 | |
| HDT, °F | 162 | 176 | 167 | 150 | 147 | 153 | 147 | 131 | | chlorine flow, were turned off and the reaction mixture was purged with a nitrogen flow rate of about 15 liters per hour until the yellow haze of chlorine was no longer visible. This required about 30 minutes. The product was then filtered, washed with warm water three times and once with distilled water, stirred in a blender with 3% potassium carbonate solution and filtered, washed neutral with distilled water, washed once with methanol and then stirred in fresh methanol for 20 minutes and filtered, and air dried and finally vacuum dried at 45–50°C. The post-chlorinated vinyl chloride-propylene copolymer thus obtained was found to have a chlorine content of 64.6%, a melt flow rate of 3.6, a specific gravity of 1.530 and an HDT of 216°F.

Using the process described in Example 2 and using additional quantities of the vinyl chloride-propylene copolymer produced by the process of Example 1 and other copolymers identified in Table 1 but carrying out the chlorination reaction for various lengths of time to introduce greater or smaller quantities of chlorine, there were obtained post-chlorinated vinyl chloride-propylene copolymers having the properties set forth in Table 2.

EXAMPLE 3

This example illustrates the post-chlorination of vinyl chloride-propylene copolymers to produce post-chlorinated copolymers having the characteristics conforming to this invention by employing a typical "dry" post-chlorination process.

The reactor employed was a Pfaudler bi-conical blender which is a closed vessel mounted for rotation about its axis. The inlet to the blender was provided with a stuffing box, permitting it to rotate about an inlet conduit for chlorine and a vent conduit for off-gas. The blender is provided with a jacket for circulation of a heat exchange fluid, water being used. The blender was charged with 50 lb. of the vinyl chloride-propylene copolymer identified as copolymer No. 2 in Table 1, and the blender was then caused to rotate to effect continuous tumbling of the resin particles which were of 40 to 325 mesh size. The 50 lb. charge occupied about 55% of the working volume of the vessel. At the same time, the jacket water was started, using 135°F water and the vessel was evacuated to 25" Hg. When the resin temperature had reached about 130°F the vacuum was broken and a 2 cubic foot per hour nitrogen purge was maintained until the resin temperture stabilized at 125° to 130°F. The flow of chlorine into the vessel was then begun at a rate of 0.3 cubic foot per minute, the nitrogen purge being left on to insure a

TABLE 2

| Post-chlorinated Copolymer | 1 | 2 | 3 | 4 | 5 | 6 | 7 | 8 | 9 |
|---|---|---|---|---|---|---|---|---|---|
| Copolymer No. (Table 1) | 1 | 1 | 1 | 1 | 3 | 5 | 6 | 6 | 7 |
| Chlorination time, hr. | 1.0 | 0.6 | 1.0 | 1.75 | 1.25 | 5.0 | 1.9 | 1.0 | 1.2 |
| Temperature, °C | 34–39 | 33–38 | 32–38 | 35 | 32–38 | 35–37 | 35 | 35 | 33–39 |
| Wgt. % Chlorine | 64.6 | 62.0 | 66.5 | 65.7 | 65.8 | 65.9 | 68.3 | 65.2 | 66.2 |
| Sp.gr. at 25°C | 1.530 | 1.510 | 1.558 | 1.518 | 1.540 | 1.570 | 1.555 | 1.519 | 1.556 |
| Melt flow rate, dg./min. | 3.6 | 7.8 | 1.1 | 12.3 | 1.9 | 0.1 | 0.4 | 1.6 | 0.35 |
| HDT, °F | 216 | 196 | 227 | 185 | 228 | 259 | 228 | 199 | 237 | positive flow into and out of the reactor. When the reaction was well under way, as evidenced by a high HCl content in the off-gas, the nitrogen flow was replaced by an air flow equivalent to about 0.1% of the chlorine flow to maintain a pressure of about 4 psig in the reactor. The reaction was continued for 22 hours. At the end of this time a 24 cubic foot per hour nitrogen purge was passed through the reactor for about 30 minutes, followed by evacuation to 20" Hg. The vacuum was broken with nitrogen, the reactor pressurized to 8 psig with nitrogen and vented, and the evacuation-pressurization cycle was repeated three times. The reactor was then cooled to a resin temperature below 100°F and emptied.

The post-chlorinated vinyl chloride-propylene copolymer thus produced had an HDT of 216°F. It contained 65.6% chlorine and had a specific gravity of 1.546 and a melt flow of 1.9 dg./min.

Using the procedure described above by varying the time and the temperature, additional quantities of copolymer No. 2 and other vinyl chloride-propylene copolymers were post-chlorinated. The details of these reactions and the characteristics of the post-chlorinated products are set forth in Table 3.

EXAMPLE 4

This example illustrates post-chlorination of vinyl chloride-propylene copolymers by a "dry" process wherein the resin particles are fluidized.

Into the vessel were charged 400 cc. of a vinyl chloride-propylene copolymer resin in particulate form with an average particle size of about 100 μ. The particular resin employed had a propylene content of 5 weight percent and a corresponding vinyl chloride content of 95 weight percent, a chlorine

TABLE 3

| Post-chlorinated Copolymer | 10 | 11 | 12 | 13 | 14 | 15 | 16 |
|---|---|---|---|---|---|---|---|
| Copolymer No. (Table 1) | 2 | 2 | 2 | 2 | 6 | 6 | 6 |
| Chlorination time, hr. | 22.0 | 12.0 | 12.0 | 34.0 | 10.0 | 21.5 | 12.0 |
| Temperature, °C | 62–74 | 52–57 | 44–57 | 46–76 | 66–79 | 54–72 | 10–73 |
| Wgt.% chlorine | 65.6 | 60.0 | 63.7 | 67.5 | 65.8 | 63.3 | 63.7 |
| Sp. gr. at 25°C | 1.546 | 1.459 | 1.511 | 1.569 | 1.538 | 1.498 | 1.499 |
| Melt flow rate, dg./min. | 1.9 | 18 | 6.3 | 0.7 | 1.2 | 6.7 | 4.2 |
| HDT, °F | 216 | 185 | 196 | 232 | 214 | 190 | 192 |
| Post-chlorinated Copolymer | 17 | 18 | 19 | 20 | 21 | 22 | 23 |
| Copolymer No. (Table 1) | 6 | 8 | 8 | 9 | 9 | 13 | 14 |
| Chlorination time, hr. | 32.0 | 3.0 | 7.0 | 19.5 | 18.0 | 12.0 | 35.0 |
| Temperature, °C | 10–73 | 42–63 | 40–88 | 50–64 | 12–74 | 12–88 | 21–78 |
| Wgt.% chlorine | 66.8 | 63.3 | 68.4 | 63.2 | 65.7 | 66.3 | 68.3 |
| Sp.gr. at 25°C | 1.545 | 1.499 | 1.591 | 1.487 | 1.533 | 1.536 | 1.573 |
| Melt flow rate, dg./min. | 1.3 | 9.7 | 0.9 | 1.4 | 0.3 | 5.4 | 2.3 |
| HDT, °F | 208 | 194 | 230 | 185 | 212 | 200 | 227 | content of 54.3 weight percent, an intrinsic viscosity of 0.61 and a specific gravity of 1.372. The light source was an 8 watt fluorescent lamp emitting light having wave lengths within the range of 4000 to 4800 Angstrom units. The charge of resin and the reaction zone were purged for a few minutes with nitrogen and then the resin was fluidized by continuously introducing into it from below a gas stream composed of chlorine and nitrogen in the ratio of 2 to 3.5, the stream being introduced at a rate of 5.5 liters per minute. After the gas stream had begun and the resin charge had become fluidized, the fluorescent lamp was turned on and the exposure of the fluidized resin to the light was continued for 7 hours. At the end of this time the lamp was turned off, the resin removed and analyzed. It was found to have a chlorine content of 65.2% by weight, an HDT of 210°F, a specific gravity of 1.539, and a melt flow of 1.9 dg./min.

It will thus be seen that post-chlorinated vinyl chloride-propylene copolymers, having the combination of characteristics discussed above can be prepared by several methods, and appropriate variations in these methods, to bring about the desired variations in the resin characteristics, within the framework of the specific combination of relationships specified, will be readily apparent to those skilled in the art.

As previously indicated, it has been discovered that post-chlorinated vinyl chloride-propylene copolymers of the character indicated can be formed into formable compositions for molding, extrusion and like operations, which, because of the properties of the post-chlorinated copolymers, have unique HDT values which make them suitable for uses heretofore foreclosed to polyvinyl chloride homopolymers. These compositions open an entirely new field of vinyl chloride polymer applications.

The following Examples and Tables 4 and 5 show various compositions comprising various stabilizers and lubricants in combination with four post-chlorinated vinyl chloride-propylene copolymers according to the invention, with and without fillers and polymeric modifiers; viz:

| Post-chlorinated VC-P Copolymer Resins | A | B | C | D |
|---|---|---|---|---|
| Original copolymer: | | | | |
| Intrinsic viscosity, dl./g. | 0.59 | 0.66 | 0.50 | 0.75 |
| Wt.% propylene | 5.5 | 4.4 | 9.6 | 3.4 |
| Post-chlorinated copolymer: | | | | |
| % chlorine | 61.6 | 64.5 | 68.5 | 67.1 |
| Melt flow rate, dg./min. | 9.7 | 1.9 | 2.3 | 0.43 |
| HDT, °F | 192 | 210 | 222 | 218 |

EXAMPLE 5

The following is an example of a formulation for a lead stabilized injection molding and extrusion compound:

| Components | Weight Parts |
|---|---|
| Copolymer A | 100.0 |
| Tetrabasic lead fumarate | 5.0 |
| Calcium stearate | 5.0 |
| Tris(nonylphenyl) phosphite | 1.0 |
| Topanol CA | 0.8 |
| Pentaerythritol | 1.0 |
| Chlorinated polyethylene (36% chlorine) | 4.4 |
| Kane Ace B12 | 12.0 |
| Titanium dioxide | 10.0 |

The foregoing formulation has the following properties:

Tensile Properties, ASTM D638, Type 1, 0.2 in./min.

| | |
|---|---|
| Ultimate tens. str., psi | 6,400 |
| Ultimate elongation, % | 83 |
| Yield strength, psi | 6,600 |
| Initial tangent modulus, psi | 360,000 |
| Tensile Impact Strength, ASTM D1822 | |
| Specimen Type "S", ft.lb./in.$^2$ | 24 |
| Izod Impact Strength, ASTM D256 | |
| Method A at 23°C, ft.lb./in. notch | 2.0 |
| Torsional Stiffness, ASTM D1043, Temperature to reach a modulus of elasticity of | |
| 135,000 psi, $T_f$ | 189°F* |
| 10,000 psi, $T_4$ | 210°F |
| Specific Gravity, ASTM D792 | |
| Method A, 23°C | 1.492 |

*Corresponding to the HDT value.

EXAMPLE 6

The following is an example of a formulation for a higher HDT lead stabilized molding and extrusion compound:

| Components | Weight Parts |
|---|---|
| Copolymer B | 100.0 |
| Tetrabasic lead fumarate | 5.0 |
| Calcium stearate | 5.0 |
| Tris(nonylphenyl) phosphite | 1.0 |
| Topanol CA | 0.8 |
| Pentaerythritol | 1.0 |
| Chlorinated polyethylene (36% chlorine) | 7.5 |
| Kane Ace B12 | 7.5 |

The foregoing formulation has the following properties:

Tensile Properties, ASTM D412, Die C, 2 in./min.

| | |
|---|---|
| Ultimate tens.str., psi | 6,000 |
| Ultimate elongation, % | 18 |
| Yield strength, psi | 7,400 |
| Initial tangent modulus, psi | 310,000 |
| Izod Impact Strength, ASTM D256 | |
| Method A at 23°C, ft.lb./in. notch | 2.5 |
| Torsional Stiffness, ASTM D1043, Temperature to reach a modulus of elasticity of | |
| 135,000 psi, $T_f$ | 210°F* |
| 10,000 psi, $T_4$ | 237°F |
| Specific Gravity, ASTM D792 | |
| Method A, 23°C | 1.466 |

*Corresponding to the HDT value.

EXAMPLE 7

The following is a formulation for a stabilized, non-toxic (food grade), injection molding and extrusion compound.

Tensile Properties, ASTM D412, Die C, 2 in./min.

| Method A, 23°C | 1.537 |
|---|---|

*Corresponding to the HDT value.

TABLE 4

| Example No. | 8 | 9 | 10 | 11 | 12 | 13 | 14 | 15 |
|---|---|---|---|---|---|---|---|---|
| Copolymer, 100 pts. | B | B | B | B | C | C | D | D |
| Calcium stearate | — | — | — | 5.0 | 5 | 5 | 3 | 3 |
| Tetrabasic lead fumarate | 5.0 | — | 5.0 | 5.0 | — | — | — | — |
| Tris(nonylphenyl) phosphite | 2.0 | — | 1.0 | 1.0 | 1 | 1 | 0.2 | 0.2 |
| Topanol CA | 0.8 | — | 0.8 | 0.8 | — | 1 | 0.2 | 0.2 |
| Pentaerythritol | 1.0 | — | 1.0 | 1.0 | 1 | 1 | 1 | 1 |
| Chlorinated polyethylene 36% chlorine | — | 10.0 | — | — | 5 | — | — | 5 |
| Kane Ace B12 | — | — | 15.0 | 13.0 | — | — | — | — |
| Dibasic lead stearate | 2.0 | — | 2.0 | — | — | — | — | — |
| Acryloid K120N | — | — | — | 2.0 | 2 | 2 | — | — |
| Mark QED | — | 2.5 | — | — | — | — | 3 | 3 |
| Mark 35 | — | 2.5 | — | — | — | — | — | — |
| Stearic acid | — | 0.5 | — | — | — | — | — | — |
| Epoxy resin (ERL 2774) | — | — | — | — | — | — | 2 | 2 |
| Mark 33 | — | — | — | — | 3 | 3 | — | — |
| Epoxidized linseed oil | — | — | — | — | 2 | 2 | — | — |
| Calcium carbonate | — | — | — | — | 5 | 5 | 10 | 10 |
| Titanium dioxide | — | — | — | — | 5 | 5 | 5 | 5 |

TABLE 5

| Example No. | 8 | 9 | 10 | 11 | 12 | 13 | 14 | 15 |
|---|---|---|---|---|---|---|---|---|
| Izod impact str. (ft.-lb./in.notch) | 0.33 | 0.64 | 1.1 | 1.6 | 0.5 | 0.4 | 0.6 | 0.7 |
| Melt flow, g./10 min. | 2.0 | 1.5 | 1.1 | 1.7 | 7.5 | 6.1 | 1 | 1 |
| Specific gr. | 1.571 | 1.475 | 1.480 | 1.460 | 1.547 | 1.562 | — | — |
| Torsional stiffness | | | | | | | | |
| $T_f$ (°F) | 210 | 208.5 | 207 | 207 | 217.5 | 223 | 212 | 203 |
| $T_4$ (°F) | 228 | 232 | 232 | 235.5 | 235.5 | 255 | 248 | 244.5 |
| Tensile properties | | | | | | | | |
| Ult.ten.str.(psi) | 7200 | 6700 | 6100 | 5300 | 6900 | 7500 | 9500 | 7800 |
| Ult. elong.(%) | 31 | 53 | 15 | 26 | 7 | 3 | 5.4 | 4.1 |
| Yield str. (psi) | 10,000 | 8400 | 8300 | 8000 | 7100 | — | 9800 | 7850 |
| Initial tensile modulus, psi | — | — | — | — | 356,000 | 410,000 | 500,000 | 426,000 |

| Components | Weight Parts |
|---|---|
| Copolymer C | 100.0 |
| Mark 33 | 3.0 |
| Calcium stearate | 5.0 |
| Pentaerythritol | 1.0 |
| Tris(nonylphenyl) phosphite | 1.0 |
| Topanol CA | 1.0 |
| Acryloid K120N | 2.0 |
| Epoxol 9-5 (epoxidized linseed oil) | 2.0 |
| Chlorinated polyethylene (36% chlorine) | 15.0 |
| Calcium carbonate | 10.0 |
| Titanium dioxide | 5.0 |

The foregoing formulation has the following properties:

Tensile Properties, ASTM D412, Die C, 2 in./min.

| Ultimate tens. str., psi | 5,400 |
|---|---|
| Ultimate elongation, % | 9 |
| Yield strength, psi | 6,000 |
| Initial tangent modulus, psi | 320,000 |
| Flexural Properties, ASTM D790 | |
| Yield strength, psi | 8,500 |
| Initial tangent modulus, psi | 370,000 |
| Izod Impact Strength, ASTM D256 | |
| Method A at 23°C, ft.lb./in. notch | 0.85 |
| Torsional Stiffness, ASTM D1043, Temperature to reach a modulus of elasticity of | |
| 135,000 psi, $T_f$ | 212°F* |
| 10,000 psi, $T_4$ | 253°F |
| Specific Gravity, ASTM D792 | |

The various components used in making the foregoing compounds with the post-chlorinated vinyl chloride-propylene copolymers of this invention are readily available commercial products. Mark QED, Mark 33 and Mark 35 are commercial stabilizers, Mark QED being composed of magnesium and zinc fatty acid soaps, and Mark 33 and Mark 35 being calcium and zinc fatty acid soaps. Kane Ace B12 is a methyl methacrylate-butadiene-styrene polymer sold commercially by Kanegafuchi Chemical Industry Company, Limited. Acryloid K12ON is an alkyl acrylate-methacrylate resin sold commercially as a modifying resin for vinyl chloride polymer compositions. Topanol CA is a condensation product of ditert.-butyl paracresol and crotonaldehyde. ERL 2744 is a bis-phenol A-epichlorohydrin condensation product.

The particular advantage of the compositions made from the post-chlorinated copolymers of this invention is that they can be used in conventional molding, extrusion, or other hot shaping apparatus, under the conditions at which such apparatus is built to operate, to produce efficiently and effectively quality rigid products having desirable HDT characteristics. For example, blow molding, or other pressure-differential molding operations, such as thermoforming, for which the rigid resinous compositions of the invention are particularly suited, can be carried out in known equipment, using known techniques. A typical blow-molding system is described, for example, in Gasmire U.S. Pat. No. 3,065,501. In like manner injection molding, and other plastic shaping operations can be carried out in standard equipment and by standard processes. A description of various types of apparatus for the hot shaping of fluxed resinous compositions, which can be termed "thermo-molding", and with which the compositions of this invention can be used, is conveniently found in "The Encyclopedia of Plastics Equipment", edited by Herbert R. Simonds and published by Reinhold Publishing Corp., New York (1964). In other words, the compositions of this invention can easily be processed effectively at temperature of 250° to 450°F. Yet, they will produce rigid shaped products which are not marred by discoloration due to degradation of the polymer and have desirably elevated heat distortion characteristics.

It will be apparent to those skilled in the art that various changes and modifications may be made in the embodiments described above without departing from the invention, as defined in the appended claims. It is intended, therefore, that all matter contained in the foregoing description and in the drawings shall be interpreted as illustrative only and not as limitative of the invention.

I claim:

1. A post-chlorinated vinyl chloride-propylene copolymer having a heat deflection temperature of at least 185°F, a chlorine content of 60% to 73% by weight and a melt flow value of from 0.1 dg./min. to 250 dg./min. said post-chlorinated copolymer prepared from a vinyl chloride-propylene copolymer having a propylene content of from about 2% to about 12% by weight, a vinyl chloride content of from about 88% to about 98% by weight, an intrinsic viscosity of 0.45 dl./g. to 1.2 dl./g. and a melt flow value of 0.3 to 1000 dg./min.

2. A composition as described in claim 1 wherein the heat deflection temperature is at least 212°F.

3. A post-chlorinated vinyl chloride-propylene copolymer as defined in claim 1, having properties within the ranges recited such that $\log MFR = 6.58 + 0.17 \sqrt{P} - 4.31 N - 0.04 HDT$ wherein $MFR$ is the melt flow rate in dg./min., $HDT$ is the heat deflection temperature in °C of the post-chlorinated copolymer, and wherein $P$ is the propylene content in weight percent and $N$ is the intrinsic viscosity of the copolymer subjected to post-chlorination.

4. A rigid resinous composition adapted to be thermomolded to provide a shaped article which comprises a post-chlorinated vinyl chloride-propylene copolymer and from about 0.1 to 10% by weight of a stabilizer and a lubricant, said post-chlorinated copolymer having a heat deflection temperature of at least 185°F, a chlorine content of 60% to 73% by weight and a melt flow value of from 0.1 dg./min. to 250 dg./min., the post-chlorinated copolymer prepared form a vinyl chloride-propylene copolymer having a propylene content of from about 2% to about 12% by weight, an intrinsic viscosity of 0.45 dl./g. to 1.2 dl./g. and a melt flow value of from 0.3 to 1000 dg./min.

5. A composition as described in claim 4 wherein the heat deflection temperature is at least 212°F.

6. A shaped article formed from a formable rigid composition comprising a post-chlorinated vinyl chloridepropylene copolymer and from about 0.1 to 10% by weight of a stabilizer and a lubricant, said post-chlorinated copolymer having a heat deflection temperature of at least 185°F, a chlorine content of 60% to 73% by weight and a melt flow value of from 0.1 dg./min. to 250 dg./min., the post-chlorinated copolymer prepared from a vinyl chloride-propylene copolymer having a propylene content of from about 2% to about 12% by weight, an intrinsic viscosity of 0.45 dl./g. to 1.2 dl./g. and a melt flow value of from 0.3 to 1000 dg./min.

* * * * *

UNITED STATES PATENT AND TRADEMARK OFFICE
CERTIFICATE OF CORRECTION

PATENT NO. : 3,925,337
DATED : December 9, 1975
INVENTOR(S) : C. A. Heiberger

It is certified that error appears in the above–identified patent and that said Letters Patent are hereby corrected as shown below:

Column 3, Line 47
    Delete "32" and substitute therefor -- 31 --

Column 5, Line 23
    Delete "surfuryl" and substitute therefor -- sulfuryl --

Column 5, Line 33
    Delete "solution" and substitute therefor -- soluble --

Column 5, Line 55
    After "as", insert -- chlorides, sulfates, acetates, etc., or oil-soluble such as --

Column 9, Line 19
    Delete "suitable" and substitute therefor -- suitably --

Column 12, Line 18
    Delete "1.267" and substitute therefor -- 1.367 --

Column 12, Line 57
    Delete "H" and substitute therefor -- $\mu$ --

Column 17-18, Table 5, Example 9, Line 2
    Delete "0.64" and substitute therefor -- 0.84 --

Column 17-18, Table 5, Example 12, Line 7
    Delete "235.5" and substitute therefor -- 253.5 --

Signed and Sealed this

Fourteenth Day of September 1976

[SEAL]

*Attest:*

RUTH C. MASON
*Attesting Officer*

C. MARSHALL DANN
*Commissioner of Patents and Trademarks*